United States Patent [19]
Birkhold

[11] 3,993,519
[45] Nov. 23, 1976

[54] SPIN WELDING APPARATUS AND METHOD

[75] Inventor: James A. Birkhold, Troy, Mich.

[73] Assignee: Olsen Manufacturing Company, Inc., Royal Oak, Mich.

[22] Filed: Nov. 7, 1975

[21] Appl. No.: 629,848

[52] U.S. Cl. ............................. 156/73.5; 156/306; 156/358; 156/360; 156/582; 228/2; 228/113; 264/68
[51] Int. Cl.² ...................................... B32B 31/20
[58] Field of Search ............... 228/2, 113; 156/360, 156/358, 73.5, 582, 306; 264/68

[56] References Cited
UNITED STATES PATENTS

| | | | |
|---|---|---|---|
| 3,344,010 | 9/1967 | Franz | 150/582 |
| 3,694,896 | 10/1972 | Lord | 228/113 |

*Primary Examiner*—Edward G. Whitby
*Attorney, Agent, or Firm*—Barnes, Kisselle, Raisch & Choate

[57] ABSTRACT

Spin welding head is rotated at a predetermined rate by a shaft through a clutch biased into engagement by springs carried by a clutch member which surrounds the shaft. After the rotating head is engaged against the workpiece, the shaft is advanced axially into the head at a predetermined rate through a predetermined distance whereupon shoulders on the head and clutch member interengage to halt the spring induced axial movement of the clutch member with the shaft. Axial movement of the shaft is continued to disengage the clutch and free the head for continued rotation independently of the shaft through its rotational inertia. The mass of the head and its rate of rotation are coordinated to keep the head spinning for long enough to complete the spin welding which was initiated while the head was being driven by the shaft. The shaft also forms a plunger which in each cycle of operation injects lubricant from a reservoir into a passageway system for lubricating the moving parts in the head.

46 Claims, 6 Drawing Figures

SPIN WELDING APPARATUS AND METHOD

This invention relates to apparatus for spin welding together two parts of a workpiece. In such an apparatus one part of the workpiece, such as a container, is held by a work holder or support and a spin head is utilized to spin the other part, such as a container cap, with the two parts interengaged so that frictional heat generated thereby fuses the material of the parts and causes them to weld together.

It is essential that the relative spinning of the two parts be sustained for long enough to insure their welding together, but the spinning should not continue for longer than necessary in order to minimize manufacture time and in order to prevent damage to the workpiece. Conventionally, timing of the spin weld procedure has been accomplished by separate timing controls used in conjunction with a variety of clutches, brakes and associated operating mechanism. The conventional spin welding apparatus thus is relatively costly and complex in structure and functioning. A typical spin welder embodying such features is disclosed, for example, in Down et al. U.S. Pat. No. 3,338,775.

The primary object of the present invention is to provide a relatively simple, inexpensive welding apparatus and method which is improved to utilize forces inherent in the spin head itself to control the time interval of the spin welding procedure, thereby eliminating external time controls, and improved to simplify the structure and functioning of the spin head itself. One form of the invention is shown in the accompanying drawings.

Figure 1:
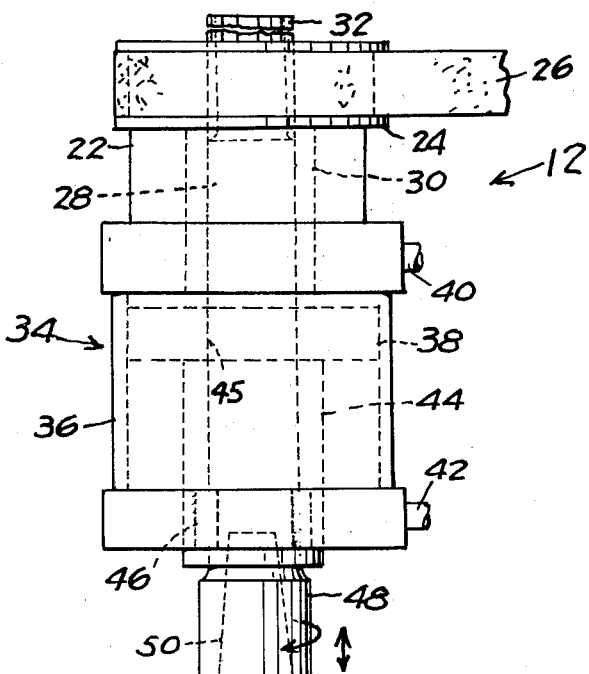
FIG. 1 is a view partly in side elevation and partly in section illustrating a spin head according to the present invention, the section being taken on line 1—1 of FIG. 3.
Figure 1:
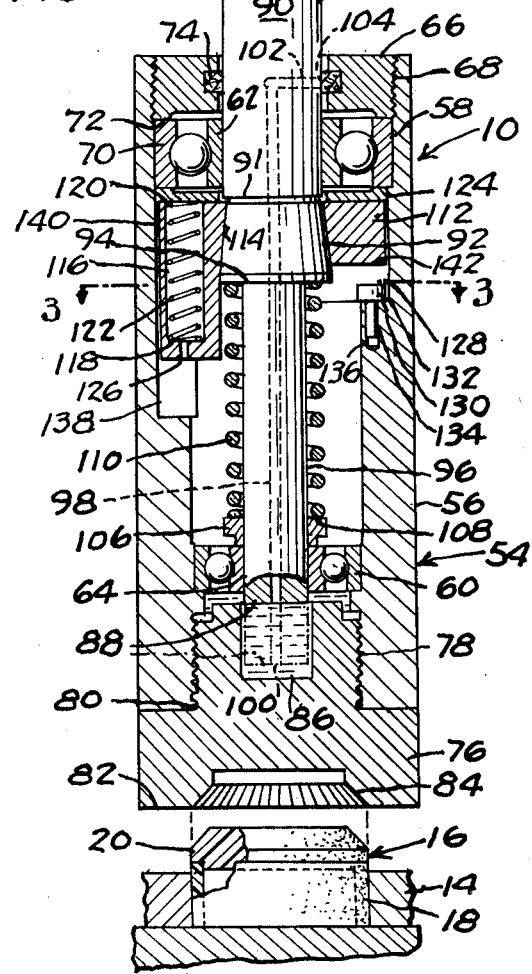

Shown in the drawings is a spin welding head 10 according to the present invention supported by a power transmission head 12 above a holder 14 for a workpiece 16 having a body 18 and a cap 20 to be secured together by spin welding. Transmission 12 is arranged both to rotate head 10 and to lower and raise the head relative to support 14.

Transmission 12 has a stationary frame 22 which supports a pulley 24 driven by a belt 26 connected with a suitable motor (not shown). Pulley 24 rotates a shaft 28 journalled on frame 22 through a bearing 30. The pulley and shaft have a spline connection 32 permitting the shaft to move axially relative to the pulley and frame 22. A motor 34 is mounted on frame 22 for moving shaft 28 vertically. In the illustrated structure this motor is pneumatic, having a cylinder 36, a piston 38 therein and airlines 40, 42 connected into conventional pneumatic circuitry for controlling the direction and rate of movement of the piston. Shaft 28 extends rotatably through an opening 45 in piston 38. Piston 38 has a hollow piston rod 44 which surrounds shaft 28 and which is secured to the shaft through a bearing 46 which provides an axial drive connection between the piston and shaft but which facilitates rotation of the shaft relative to the piston. Shaft 28 has an adapter 48 below motor 34 adapted for connection at 50 with an extension of a shaft 52 forming a part of spin head 10.

The spin head includes a housing 54 having a side wall 56 within which shaft 52 is journalled through ball bearings 58, 60. Shaft 52 is axially slidable within the inner races 62, 64 respectively of the bearings. The upper end of housing 54 is closed by nut 66 threaded into side wall 56 as at 68 and abutting the outer race 64 of bearing 58 as at 72. Nut 66 has an interior circumferential groove which carries a dirt seal ring 74 of felt, or the like, engaged against shaft 52.

The lower end of housing 54 is closed by a cap 76 threaded into side wall 56 at 78. An O-ring seal 80 is provided between the cap and side wall to contain lubricant within housing 54. The lower end surface 82 of cap 76 is recessed to provide a serrated cup 84 dimensioned and contoured for driving engagement with cap 20 of workpiece 16. End cap 76 has an upwardly open cylindrical recess 86 aligned with the lower end 88 of shaft 52. Recess 86 forms a reservoir for lubricant.

Shaft 52 has successively an upper cylindrical portion 90 which passes through bearing 58, a lubricant collection groove 91, a conical portion 92 tapering to a larger diameter and providing a clutch surface, a radially inward shoulder 94 and a cylindrical continuation 96 of reduced diameter which passes through bearing 60 and terminates at lower end portion 88. End portion 88 forms a lubricant-injection plunger for insertion into reservoir 86. Shaft 52 has an internal axial passageway 98 which opens through end portion 88 at 100 and turns radially at 102 to open through shaft portion 90 at 104 adjacent the upper end of housing 54. Shaft portion 96 passes slidably through a collar 106 which abuts bearing 60 and has an upper surface 108 forming a seat for a coil spring 110 compressed between the seat and shoulder 94.

An annular clutch member 112 surrounds shaft 52 and has a conical clutch surface 114 engaged with conical clutch surface 92 on the shaft. Radially outwardly of surface 114 the clutch member is provided with a plurality (four shown) of sockets 116 distributed circumferentially uniformly about the axis of surface 114. Each socket has a shoulder 118 adjacent its bottom end and has an open upper end 120. A coil spring 122 in each socket seats on shoulder 118 and extends through open end 120 for seating against a spacer or washer 124 axially interposed between bearing 58 and the upper end of clutch member 112. Each spring 122 is compressed between shoulder 118 and spacer 124. Each socket 116 is provided with a drain opening 126 through its bottom for a purpose to be described.

Figure 3:
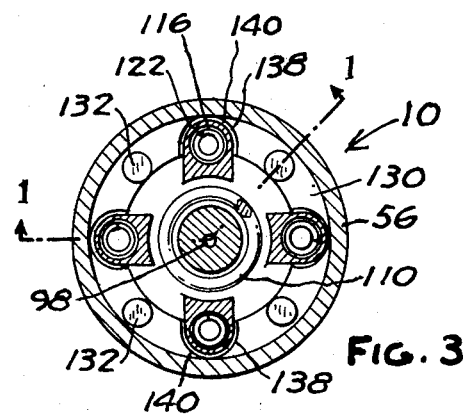
FIG. 3 is a sectional view on line 3—3 of FIG. 1.

Clutch member 112 is axially movable relative to housing 54 and within a chamber 128 in housing 54. At the bottom of this chamber, wall 56 has a radially inward circumferential shoulder 130 providing a seat for a plurality (four illustrated) of circumferentially uniformly distributed spacers 132. In the form of the invention illustrated each spacer comprises a head on a shank 134 which fits removably within an axial bore 136 through shoulder 130 into portions of side wall 56 therebelow. Below shoulder 130 side wall 56 is also provided with an axially extending groove 138 for each socket 116. The radially outward wall portion 140 of each socket fits axially slidably within a groove 138. As is best illustrated in FIG. 3, socket 140 and their respective grooves 138 are distributed in alternate circumferential arrangement with spacers 132. Clutdh annulus 112 has a radial shoulder portion 142 axially aligned with each spacer 132.

In use it will be assumed that initially head 10 is retracted upwardly relative to work holder 14 and that a workpiece 16 is mounted on the work holder. Pulley 24 is rotated by belt 26 for rotating shafts 28, 52, Clutch annulus 112 is biased downwardly by springs 122 so that clutch surfaces 92, 114 are interengaged for rotating the clutch annulus. The clutch annulus, in turn, rotates housing 54 by engagement of socket walls 140 within grooves 138 in wall 56. A quantity of lubricant has been introduced into reservoir 86.

Figure 5:
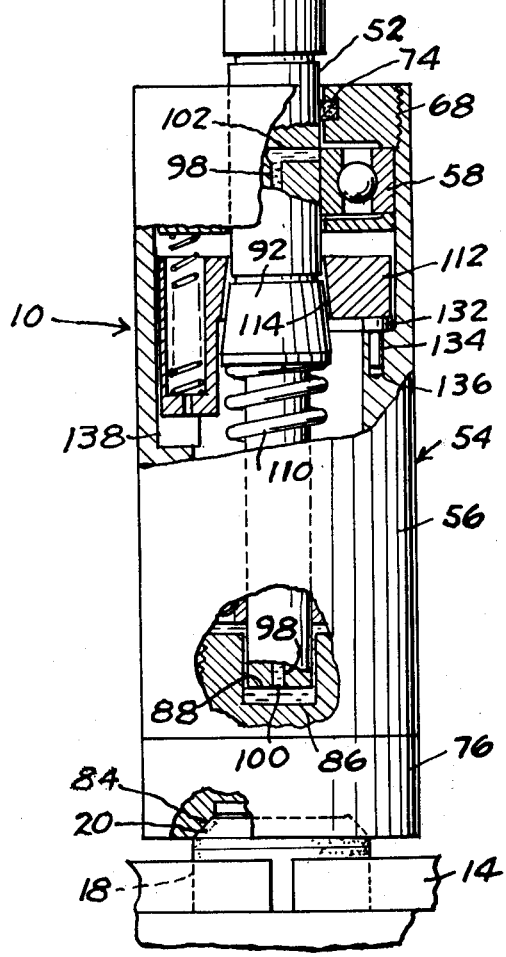
FIG. 5 is an enlarged scale fragmentary partly sectional view of a two part workpiece prior to the spin welding step.
Figure 5:
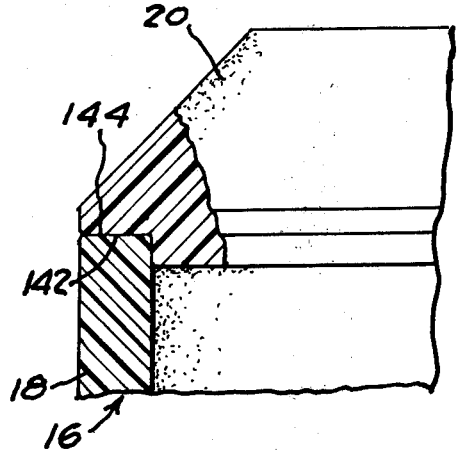

Air under pressure is introduced into cylinder 36 above piston 38 through airline 40 to lower the piston, shafts 28, 52 and head 10 so that cup 84 at the lower end of the head engages cup 20 of workpiece 16 and begins to spin it relative to body 18 which is held stationary by holder 14. The body and cap have interengaged radially extending surfaces 142, 144 (FIG. 5) which begin to heat under the friction of their relative movement.

Figure 2:
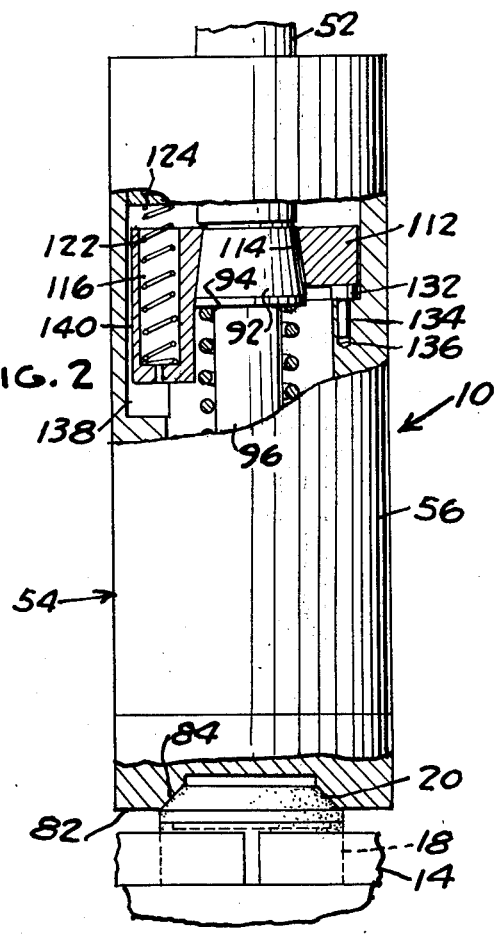
FIG. 2 is a generally side elevational view of the spin head with a portion broken away to illustrate a position of its part different from FIG. 1.
Figure 4:
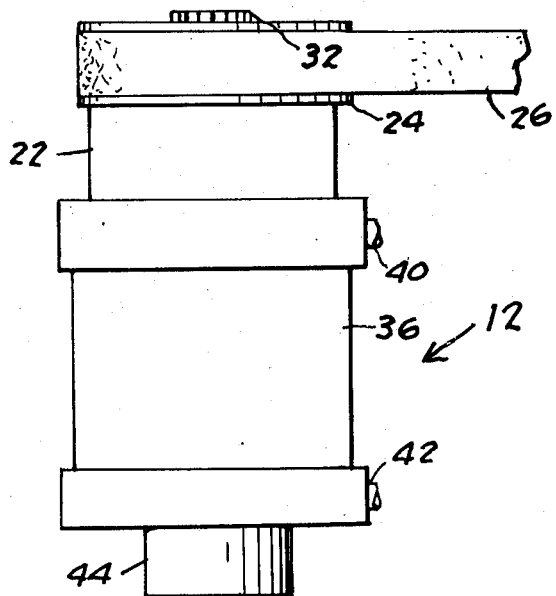
FIG. 4 is a generally elevational view of the spin head with portions broken away to illustrate a third relative position of its parts.

Downward movement of housing 54 is halted by engagement of cup 84 against workpiece 16. However, shafts 28, 52 continue to move downwardly relative to housing 54 against the bias of spring 110 and in an initial range of this movement clutch member 112 moves downwardly with shaft 52 under the impetus of springs 122, which maintains clutch surfaces 92, 114 in interengagement so that in this range of movement shaft 52 continues to rotate housing 54. At the end of this initial range of movement, shoulders 142 on the underside of clutch member 112 engage spacers 132, thereby halting downward movement of the clutch member. The parts are now in the position illustrated in FIG. 2. Thereafter shafts 28, 52 continue their downward movement independently of housing 54, sufficiently to disengage clutch surfaces 92, 114 and thereby disconnect the drive connection between shaft 52 and housing 54. The parts are now in the relative position illustrated in FIG. 4.

Figure 6:
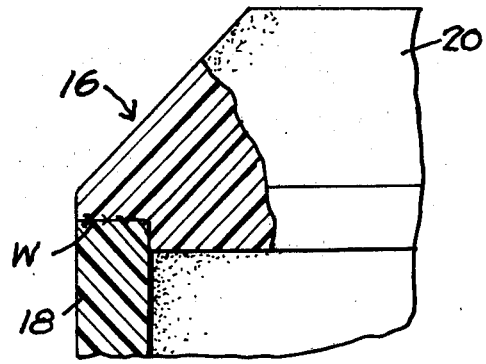
FIG. 6 is a view similar to FIG. 5 but illustrating portions of the workpiece parts spin welded together.

The rotational inertia of housing 54 and clutch annulus 112 causes the housing to continue to rotate independently of shaft 52 after clutch surfaces 92, 114 have been disengaged. Housing 54, in turn, continues to spin cap 20 relative to body 18 for a sufficient time to effect a weld W between surfaces 142 and 144 (FIG. 6). Thereafter head 10 is again retracted upwardly by introducing air under pressure through airline 42 into cylinder 36 and exhausting airline 40 to raise piston 38. During this movement spring 110 expands to re-engage clutch surfaces 92, 114 for resuming rotation of housing 54, and spring 110 returns clutch member 112 upwardly against the bias of spring 112 out of engagement with spacers 132 into engagement with spacer 124 as shown in FIG. 1. The completed work is removed from support 114, and a new workpiece 16 is inserted preparatory to the subsequent cycle of operation.

In each cycle of operation when shaft 52 is lowered relative to housing 54 its lower end 88 enters reservoir 86 and injects a quantity of lubricant upwardly into passageway 98, 102 and out of opening 104 to lubricate bearing 58. During the course of operation, the lubricant migrates downwardly into groove 91 and from there downwardly to lubricate clutch surfaces 92, 114 and bearing 60, then returning to reservoir 86. The lubricant thus circulates through a passageway system which includes not only passageway 98, 102 but various clearances and spaces between internal parts of head 10. Some of the lubricant is thrown radially outwardly by centrifugal force and enters spring sockets 116. Drain openings 126 in the bottom of these openings prevent the lubricant from accumulating therein and permit it to return downwardly to reservoir 86.

During the work stroke of head 10, the initial time interval during which housing 54 is driven by shaft 52 is determined by the axial distance between clutch shoulders 142 and the tops of spacers 132, and the rate at which clutch 112 is lowered relative to housing 54. The second time interval during which housing 54 rotates under its own inertia is determined by the rate of rotation of housing 54, the combined mass of the housing and clutch member 112, the combined axial force of housing 54 against cap 20 by virtue of its own weight plus the force of spring 110 as it is compressed by downward movement of shoulder 94, and the frictional resistance of workpiece shoulders 142, 144 to the spinning.

Given the size, configuration and frictional characteristics of a workpiece, an approximation of the required axial force of the head against the workpiece, the rate of rotation of head 10 and the total spin time for effecting a satisfactory weld W can be obtained by mathematical calculations. For a head 10 of a known weight a spring 110 of suitable force and a spacer 132 having suitable axial thickness can be selected on the basis of such calculations and assembled into housing 54. The only remaining variables are the rate of rotation of head 10 and the rate at which piston 38 moves downwardly in the work stroke. These factors can be set by appropriate adjustments of a conventional speed control for the motor driving belt 26 and of conventional meter valving in the pneumatic circuitry to cylinder 36. Some testing may be required to arrive at the proper combination of spring 110, spacers 132, rate of head rotation and rate of piston movement, particularly the latter two factors. However, the extent of such testing is little, if any, greater than that required with conventional spin heads, and once a satisfactory combination of the factors has been found the spin head thereafter provides its own spin time control, eliminating the necessity for additional separate timing controls.

Where a maximum period of shaft-driven spinning of housing 54 is required, spacers 132 may be removed entirely and shoulder 130 used to stop downward movement of clutch member 112. This situation might arise, for example, where housing 54 and clutch 112 have a relative small mass or where the frictional resistance of the workpiece is unusually great. On the other hand, in some applications it may be necessary or desirable to disconnect the drive connection immediately upon engagement of head 10 against a workpiece. In this case, spacers 132 are used having an axial thickness adequate to span substantially the entire axial distance between wall shoulder 130 and clutch shoulders 142. With this arrangement only the inertial spinning of head 10 would be utilized to effect the weld. This situation might arise, for example, where head 10 has a large mass or where the frictional resistance of the workpiece is small.

It may be necessary or desirable to change spring 110 and/or spacers 132 to adapt head 10 for use with a particular workpiece 16. To accomplish this, shaft coupling 50 is disconnected and closure nut 66 is threaded out of the upper end of housing 54, then bearing 58, washer 124, clutch member 112 and shaft 52 are removed from the housing. Spring 110 and spacers 132 are now exposed for replacement. Collar 106 and the spring are removed from the shaft, the shaft is then inserted through the replacement spring and again through the collar. Since spacer shanks 134 fit slidably in their sockets 136, spacers 132 can be removed simply by lifting them axially away from shoulder 130 and the shanks of the replacement spacers inserted in their stead. The components are then reassembled by reversing the disassembly procedure, and coupling 50 is reconnected. Head 10 is now again ready for use.

I claim:

1. Apparatus for spin welding together two parts of a workpiece which comprises,
    a workpiece holder and a spin head mounted for relative closing movement to interengage said head and one part of a workpiece,
    drive means operable to rotate said head at a predetermined rate during said closing movement and during interengagement of said head and workpiece, said drive means including a clutch,
    said drive means and head being relatively linearly movable at a predetermined rate during said interengagement and while said clutch is engaged,
    release means operable to release said clutch responsive to continuation of said relative linear movement after movement through a predetermined distance whereby to disconnect the drive connection between said drive means and head after a predetermined time interval following said interengagement,
    said head having a predetermined mass, said mass and rate of rotation being coordinated to provide said head with rotational inertia adequate to cause said head to continue rotation independently of said drive means for an additional time interval after said disconnection sufficient to complete the spin welding of the workpiece parts.

2. The apparatus defined in claim 1 wherein said relative closing movement and said relative linear movement are in substantially the same direction.

3. The apparatus defined in claim 2 wherein said relative movements are substantially coaxial.

4. The apparatus defined in claim 2 wherein said relative movements are substantially coaxial with each other and with the axis of rotation of said head.

5. The apparatus defined in claim 1 wherein said clutch has a member which through said distance shares the relative linear movement of said drive means, said release means comprising means on said member and head which interengage to transfer said clutch member into relative-linear-movement-sharing relation to said head.

6. The apparatus defined in claim 5 wherein said drive means includes a rotatable shaft having a clutch surface engaged by a surface of said clutch member through said distance, said surfaces being disengaged by said continuation of said relative linear movement.

7. The apparatus defined in claim 6 wherein said clutch surfaces are maintained in interengagement through said distance by a spring bias.

8. The apparatus defined in claim 7 wherein said spring bias is provided between said clutch member and other means on said head.

9. The apparatus defined in claim 8 wherein said clutch member has the form of an annulus which surrounds a portion of said shaft having said clutch surface, said annulus carrying spring means providing said bias.

10. The apparatus defined in claim 9 wherein said spring means comprises a plurality of springs distributed substantially uniformly circumferentially of said annulus.

11. The apparatus defined in claim 10 wherein said annulus has a corresponding plurality of axially extending sockets so distributed, each said spring being disposed in a said socket.

12. The apparatus defined in claim 11 wherein each socket is open at one end and has a shoulder adjacent its other end, each spring comprising a coil spring engaging said shoulder and extending through said open end into engagement with said other means on said head, each coil spring being compressed between said shoulder and other means.

13. The apparatus defined in claim 12 wherein said surfaces are substantially conical about the axis of rotation of said shaft, said annulus having portions radially outwardly of the clutch member surface in which said sockets are provided.

14. The apparatus defined in claim 1 wherein said release means includes means on said drive means and head which interengage after relative linear movement of said drive means and head through said distance.

15. The apparatus defined in claim 14 wherein said relative linear movement is substantially parallel to the axis of rotation of said head, and said interengaging means on said head and drive means extend generally radially thereof.

16. The apparatus defined in claim 15 wherein said heas has a wall radially outward of said means on said drive means, said means on said head being associated with a generally radially inward shoulder on said wall.

17. The apparatus defined in claim 16 wherein said associated means comprises the surface of said shoulder.

18. The apparatus defined in claim 17 wherein said associated means comprises a spacer positioned on said shoulder and having a predetermined axial thickness.

19. The apparatus defined in claim 18 wherein said wall has a generally axially extending socket which opens through said shoulder, said spacer comprising a shank which fits within said socket and a head on said shank which rests on said shoulder and has said axial thickness.

20. The apparatus defined in claim 19 wherein said shank fits removably in said socket to facilitate use optionally of no spacer and spacers having different head thicknesses for selectively adjusting said distance.

21. The apparatus defined in claim 1 wherein said drive means comprises a rotatable shaft, said head having the form of a housing rotatably mounted around portions of said shaft through bearing means,
    means defining a lubricant reservoir within said housing provided with an opening aligned with said shaft, said shaft having an end portion forming a plunger contoured to fit within said reservoir opening, means defining a lubricant passageway system extending from said reservoir to said bearing means and clutch, said plunger responsive to said relative linear movement being operable to inject lubricant from said reservoir into said system.

22. The apparatus defined in claim 21 wherein said shaft and housing extend generally vertically, said reservoir being provided beneath said plunger, said system including a delivery passageway which extends from said reservoir to an upper portion of said housing, said system including clearances associated with said bearings and clutch through which lubricant returns gravitationally to said reservoir.

23. The apparatus defined in claim 22 wherein said housing has a lower end with a closure provided with said means defining said reservoir.

24. The apparatus defined in claim 23 wherein said reservoir comprises a recess in an upper portion of said closure.

25. The apparatus defined in claim 24 wherein said recess and plunger are substantially cylindrical and said plunger has slightly the smaller diameter, said delivery passageway extending axially through said shaft from said plunger portion, upwardly to a location adjacent said upper portions of said housing and thence laterally to the exterior of said shaft.

26. The apparatus defined in claim 24 wherein said closure has an exterior lower end adapted so to engage said one part of a workpiece.

27. The apparatus defined in claim 1 wherein said drive means comprises a rotatable shaft, said head having the form of a housing rotatably mounted through bearings around portions of said shaft including said clutch, said clutch including a clutch member in the form of an annulus surrounding a portion of said shaft, the latter said shaft portion and said annulus having clutch surfaces conical around the axis of rotation of said shaft, coil springs contained in axially extending sockets uniformly distributed circumferentially of portions of said annulus radially outward of said clutch surfaces, each spring being held in compression by engagement by one end with a bottom of a said socket and engagement at the other end with a surface on said head, said shaft being axially movable within said bearings and relative to said head to facilitate said relative linear movement and said clutch being axially movable with said shaft, said housing having means which provide radially inward shoulders distributed uniformly circumferentially around the interior of the housing in alternate circumferential relation to said sockets, said annulus having shoulder portions correspondingly alternately circumferentially distributed so as to be axially aligned with said housing shoulders, said springs being effective to maintain said clutch surfaces in interengagement during axial movement of said clutch member with said shaft through said distance, said shoulders on said annulus and housing interengaging upon such axial movement through said distance, said interengaged shoulders restraining further axial movement of said clutch member with said shaft and thereby providing said release means.

28. The apparatus defined in claim 27 and including spring means stressed to yieldably resist said relative linear movement.

29. The apparatus defined in claim 28 wherein said spring means comprises a coil spring around said shaft compressed between a shoulder on said shaft adjacent said conical surface thereof and means axially immobile on said head.

30. The apparatus defined in claim 1 and including spring means stressed to yieldably resist said relative linear movement.

31. The apparatus defined in claim 30 wherein said drive means comprises a rotatable shaft, said head having the form of a housing rotatably mounted through bearings around said shaft and clutch, said shaft being axially movable within said bearings and relative to said head to facilitate said relative linear movement, said spring means comprising a coil spring around said shaft compressed between a shoulder on said shaft and means axially immobile on said head.

32. The apparatus defined in claim 31 wherein said shaft is movable toward said support to effect said closing movement.

33. The method of spin welding together two parts of a workpiece which comprises providing a workpiece holder and a spin head rotatable relative thereto through drive means having a drive connection with said head, utilizing said drive means to rotate said head at a predetermined rate, while said head is so rotating, engaging said head axially forcibly against one part of the workpiece for spinning the same relative to the other part and thereby initiating the spin welding, while so spinning said one part, effecting relative linear movement between said drive means and head at a predetermined rate and through a predetermined distance, after a time interval determined by said rate and distance of linear movement, disconnecting said drive connection and utilizing the rotational inertia of said head to continue rotation thereof independently of said drive means, and so coordinating said rate of rotation of said head with the mass thereof that said inertia is adequate to sustain said continued rotation for an additional time interval sufficient to complete the spin welding of said parts together.

34. The method defined in claim 33 wherein said relative linear movement is initiated immediately after said engaging step.

35. The method defined in claim 34 wherein said relative linear movement is initiated in response to said engaging step.

36. The method defined in claim 35 wherein said relative linear movement is substantially rectilinear.

37. The method defined in claim 35 wherein said drive means comprises a rotatable shaft on which said head is mounted, said engaging step being effected by relatively moving said shaft and holder axially of said shaft, utilizing the engagement of said head with said one part to halt said relative axial movement and after said head is halted, continuing to move said shaft axially to effect said relative linear movement.

38. The method defined in claim 37 wherein said drive means and head are provided with axially aligned interengagable means spaced axially apart by said distance, said disconnecting step being effected by causing said means to interengage.

39. The method defined in claim 38 wherein said drive means includes a clutch member having a clutch surface engaged with a clutch surface on said shaft to provide said drive connection, said means on said drive means being provided on said clutch member,
   causing said clutch member to move axially with said shaft through said distance, utilizing the interengagement of said means to halt axial movement of said clutch member, and continuing axial movement of said shaft to effect disengagement of said clutch surfaces.

40. The method defined in claim 39 wherein spring means stressed between said clutch member and other means on said head is utilized to cause said clutch member is to move axially with said shaft.

41. The method defined in claim 40 wherein said interengaging step is effected by moving said shaft and head toward said holder.

42. The apparatus defined in claim 7 wherein said holder and head are mounted for both closing and parting movement, spring means yieldably resisting said relative linear movement, said spring means being operable to effect return relative linear movement of said head and drive means responsive to said parting movement whereby to re-engage said clutch surfaces, said spring bias being effective to hold said surfaces in interengagement during said return movement through said distance.

43. The apparatus defined in claim 18 wherein said spacer has an axial thickness which substantially equals said distance so that said clutch is released substantially immediately upon interengagement of said head and workpiece.

44. The apparatus defined in claim 27 wherein said sockets have side walls axially slidably disposed within grooves in said housing, said side walls and grooves cooperating to provide a rotational drive connection between said clutch member and housing.

45. Apparatus for spin welding together two parts of a workpiece which comprises,
   a workpiece holder and a spin head mounted for relative closing movement to interengage with axial force said head and one part of a workpiece for spinning the same relative to the other part,
   drive means operable to rotate said head at a predetermined rate during said closing movement, said drive means including a clutch,
   said drive means and head being relatively axially movable responsive to said force for releasing said clutch, whereby to disconnect the drive connection between said drive means and head,
   said head having a predetermined mass, said mass and rate of rotation being coordinated to provide said head with rotational inertia adequate to cause said head to continue rotation independently of said drive means for a time interval after said disconnection sufficient to complete the spin welding of the workpiece parts.

46. The method of spin welding together two parts of a workpiece which comprises,
   providing a workpiece holder and a spin head rotatable relative thereto through drive means having a device connection with said head,
   utilizing said drive means to rotate said head at a predetermined rate,
   while said head is so rotating, engaging said head axially forcibly against one part of the workpiece for spinning the same relative to the other part,
   after said engaging step, effecting relative axial movement between said drive means and head and thereby disconnecting said drive connection,
   while said head and one part are so engaged, utilizing the rotational inertia of said head to continue rotation of said head and one part independently of said drive means,
   and so coordinating said rate of rotation of said head with the mass thereof that said inertia is adequate to sustain said continued rotation of said head and one part for a time interval sufficient to complete the spin welding of said parts together.

* * * * *

UNITED STATES PATENT OFFICE
CERTIFICATE OF CORRECTION

PATENT NO. : 3,993,519
DATED : November 23, 1976
INVENTOR(S) : James A. Birkhold It is certified that error appears in the above-identified patent and that said Letters Patent are hereby corrected as shown below:

Column 7, Line 48    Cancel "by" and insert -- at --

Column 9, Line 20    Cancel "is" and insert -- so --

Column 10, Line 25   Cancel "device" and insert -- drive --

Signed and Sealed this

Fifteenth Day of February 1977

[SEAL]

Attest:

RUTH C. MASON
Attesting Officer

C. MARSHALL DANN
Commissioner of Patents and Trademarks